Sept. 1, 1970          J. R. PIPER          3,526,361

HEATING SYSTEM

Filed Jan. 10, 1968          2 Sheets-Sheet 1

INVENTOR
JAMES R. PIPER
BY
Lyon & Lyon
ATTORNEYS

Sept. 1, 1970    J. R. PIPER    3,526,361
HEATING SYSTEM
Filed Jan. 10, 1968    2 Sheets-Sheet 2
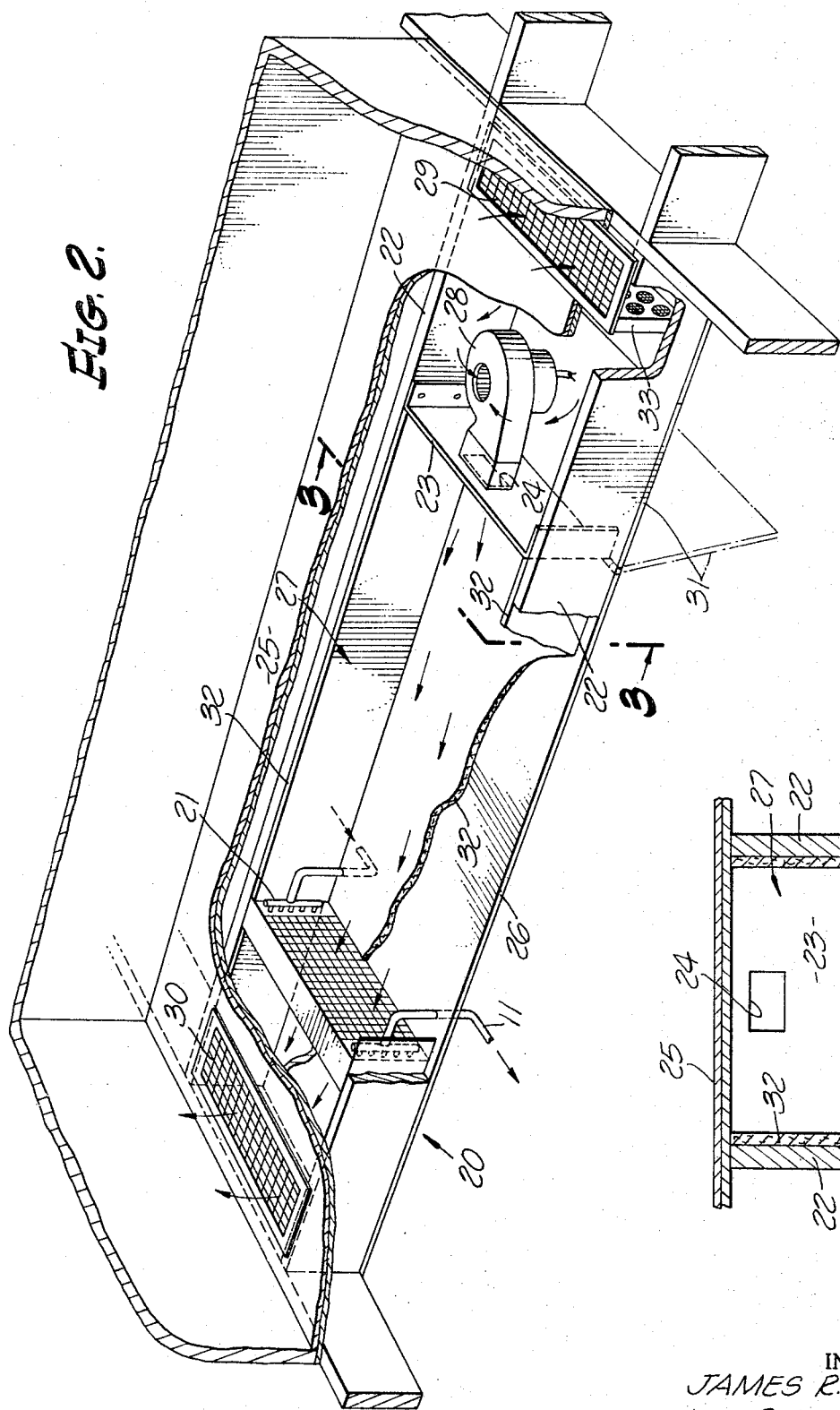
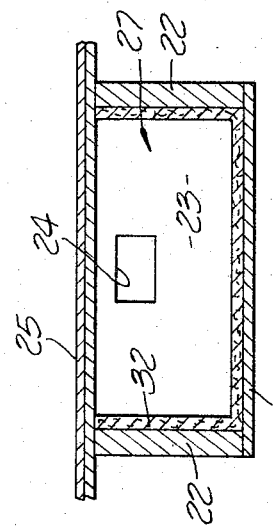
INVENTOR
JAMES R. PIPER
BY
*Lyon & Lyon*
ATTORNEYS United States Patent Office 3,526,361
Patented Sept. 1, 1970

3,526,361
HEATING SYSTEM
James R. Piper, Palos Verdes, Calif., assignor to Balance-Flo, Inc., Newport Beach, Calif., a corporation of California
Filed Jan. 10, 1968, Ser. No. 709,518
Int. Cl. F24d 3/02, 3/08
U.S. Cl. 237—8
12 Claims

ABSTRACT OF THE DISCLOSURE

A heating system, using a potable hot water supply normally associated with today's homes and apartments, which continually circulates hot water in a closed circuit through a series of heat exchange coils through which air is passed by means of a thermostatically controlled fan to provide heat to the rooms of a building. Structurally members already essential to the construction of the building are utilized to conveniently form the plenum as an integral part of the heat exchanger apparatus used in the heating system.

---

This invention relates to a system for heating a building and, in particular, to a system for circulating air past heat exchange coils to heat the air and distribute the same throughout a room or rooms in the building wherein the heat source is the normal potable hot water supply.

Today's homes and apartments normally use a hot water heater to provide hot tap water for cooking, bathing and other domestic purposes. Generally, an entirely separate apparatus is employed to heat the rooms of the building. By combining the potable hot water system with the air heating system, the utility and operation of both systems are improved and yet it is possible to employ the best materials at a lower cost than lesser quality materials required for two separate systems.

Furthermore, the normal air heating systems used in today's building industry are difficult and expensive to install because they fail to utilize the already existing structural members of the building.

There are numerous heating systems in use today, including gas forced air heating, electric sealed heat, radiant heat, and steam heat. Also several present conventional heating systems employ the principle of creating a heat transfer by using a heat exchanger. None of the present systems, however, use the potable hot water supply as the heat source and utilize the structural members of the building to construct and install the heating system. Furthermore, the heating systems which are similar to this invention require valving to control the system.

This invention is hydronic in nature and obtains the most efficient method of heat transfer from the most inexpensive fuel available in the particular area.

Accordingly, it is a principal object of this invention to provide a novel system for heating air within the rooms of a building wherein an ordinary potable hot water heater is used to produce the necessary temperature gradient required for a heat exchanger apparatus.

Another object of this invention is to continually circulate hot water through the heating system even when not heating the room, thereby eliminating a complicated valve system which would detour the circulating water away from the heating system when the air temperature of the room was already sufficiently high and also eliminating the trapping of water which otherwise might become stagnated and produce undesirable results when reintroduced into the potable hot water system.

A further object of this invention is to use the structural members essential to the construction of the building to aid in the installation and construction of the heat exchanger apparatus used in the heating system.

Another object of this invention is to provide a potable hot water system which supplies hot water instantly at the taps or faucets as an adjunct to the room heating system.

Other and more detailed objects and advantages of this invention will appear from the following description and accompanying drawings.

FIG. 2 is a perspective view partially in section showing the preferred form of heat exchanger apparatus as installed in the building.

FIG. 3 is a cross-sectional view of the heat exchanger apparatus taken substantially on the lines 3—3 as shown in FIG. 2.

Figure 1:
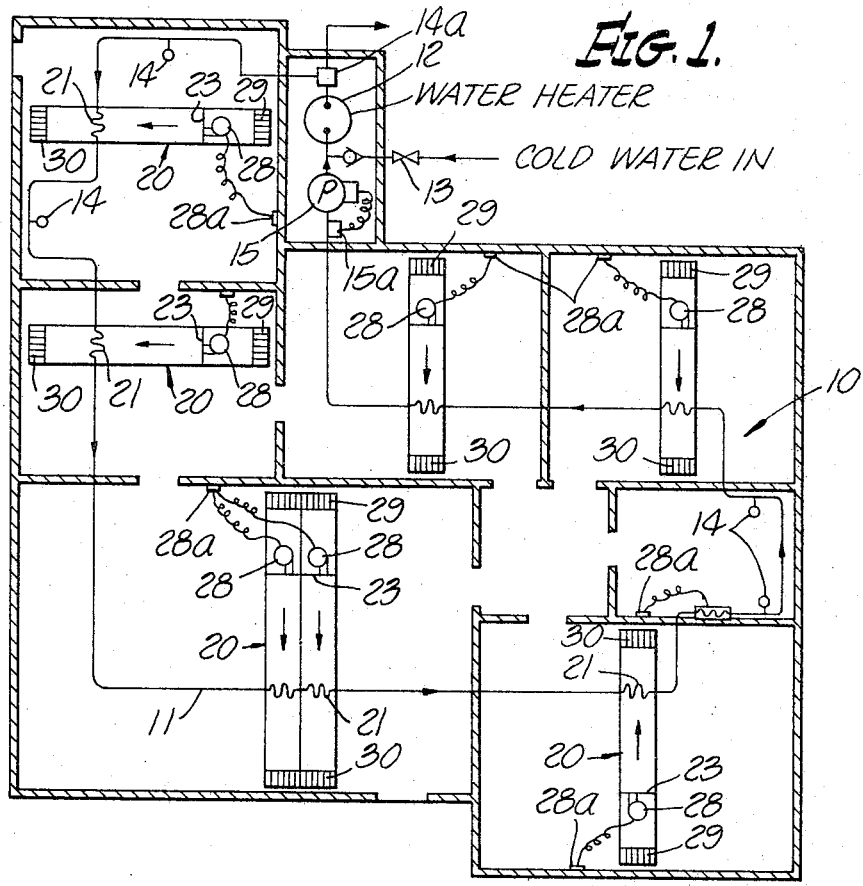
FIG. 1 is a diagrammatic illustration showing a typical preferred form of the system of the invention as incorporated within a building containing a potable hot water system.

Referring to the drawings, the heating system, generally designated 10, includes a closed loop conduit 11 to provide communication of the water throughout the building. This conduit 11 is preferably formed of copper tubing or pipe to avoid corrosion within the system.

A water heater 12, as found in a normal potable hot water system, is connected in series with the conduit 11 to heat the water to a predetermined temperature of approximately 140° F. to 150° F. The water heater 12 heats the water already circulating in the system 10 and heats any new water added to the system by an inlet water supply 13 which is connected to the conduit 11, immediately upstream of the water heater 12. Preferably, the water heater should be a high recovery type. While the thermostat of the water heater 12 would be sufficient to turn the heater on when the circulating water is too cold or fresh water is being added due to a loss of hot water through an opened hot water faucet, various other controls can be added to the system 10 to anticipate the temperature drop in the returning water more quickly than the conventional thermostat control water heater.

Located throughout the system 10 are various branch conduits 14 or faucets in which potable hot water may be extracted when needed. These branch conduits 14, of course, supply the necessary hot water for all domestic uses.

Although it is not essential an air relief valve 14a may be connected to the conduit system 11 to relieve the system of any air accumulation but normally this air will be naturally extracted with the tap water.

To continually circulate the water through the conduit 11, a pump 15 is connected to the conduit 11. A two-speed pump can be used to permit the hot water to be circulated slowly when there is little or no heating demand and circulate a greater volume of water when there is a heating demand. A thermostat 15a, responsive to the return water temperature and connected to the conduit 11 immediately preceding the entrance of the return water into the hot water heater 12, controls the pump 15.

The heat exchanger apparatus, as shown in FIG. 2 and generally designated 20, includes a heat exchange coil 21 which is connected in series in the system 10. The number of heat exchangers 20 in the system 10 will depend on the heat output required to heat the building. The heat exchange coil 21 may also be formed of copper and is mounted between a pair of the normal parallel structural members or floor joists 22 near one side of a room in the building. Opposite the heat exchange coil 21 and also mounted between the same joists 22 at the other side of the room is a partition wall 23. The partition wall 23 is provided with an opening 24 which acts as an inlet for air. The floor 25 of the room and an enclosing cover 26 form a plenum 27 between the heat exchange coil 21 and the partition wall 23, with the joists 22 operating as the side walls of the plenum 27. An electric fan 28 is connected to the other side of the partition wall 23 outside the plenum 27. The fan 28 is operated by a thermostat control 28a which is located in the room. The outlet of the fan is connected to the inlet opening 24 of partition wall 23 to provide a passage for air between the fan 28 and the plenum 27. The plenum 27 is sufficiently large in order to provide a slow air movement which causes improved heat transfer between the air and the heat exchange coil 21 and also causes less air disturbance in the area to be heated. All the air passing through the plenum 27 must pass over the heat exchange coil 21 before entering the area to be heated.

Airflow registers 29 and 30 are located between the joist and at opposite ends of the room on the floor 25. Airflow register 29 allows cold air to be drawn from the room by the fan 28 while airflow register 30 allows the heated air to pass from the plenum into the room. A trap door 31 provides access to the electric fan 28 for maintenance. The plenum 27 may be lined with insulation 32, such as fiber glass, to minimize any heat loss. To eliminate dust in the air, a filter 33 is positioned between the fan 28 and the air register 29 to screen all air before it enters the plenum 27.

In addition to the above components, the hot water of the heating system 10 could be passed through conventional heat exchangers to heat other things, such as swimming pool water. The pool water and the potable hot water would be kept separate, though.

While this system is primarily advantageous as a heating system and has been so described, through the use of a separate system and chilled water the principles and construction advantages of the heating system could be applied to form a cooling system.

Figures 4, 5:
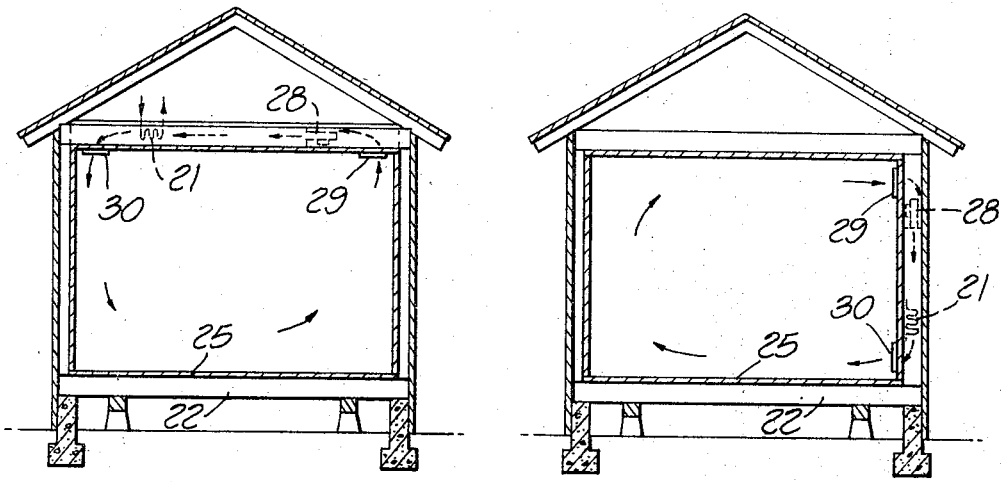
FIG. 4 is a diagrammatic view of a modified version of the system showing the heat exchanger apparatus installed in the ceiling of the building.
FIG. 5 is a diagrammatic view of a modified version of the system showing the heat exchanger apparatus installed in the wall of the building.

In a modified form of the heating system as shown in FIGS. 4 and 5, the heat exchanger apparatus 20 could be placed in either the ceiling or wall of the building. Existing structural members, such as the ceiling joists and wall studs used in the construction of the building, would again be utilized in the formation of the plenum and installation of the heat exchanger apparatus.

While the heat exchange coil 21 has been described as a single coil in series it is obvious that such could comprise two or more coils parallel to each other or even a conduit in parallel to reduce the flow through one coil but still in series relation to the whole system.

The operation of the device is as follows: Water which has been heated by the heater 12 is continually circulated through the closed loop conduit 11 by the pump 15. All of this hot water passes through each heat exchange coil 21 since they are connected in series with the conduit 11. When heat is required in a room, thermostat 28a activates the electric fan 28 which draws cold air from the room through the register 29 and forces it through the plenum 27 and entirely across the heat exchange coil 21 which heats the air. The heated air then passes out through the register 30 into the room. When the room is sufficiently heated, the thermostat turns off the fan 28 and the flow of hot air into the room discontinues. The hot water continues to flow through the heat exchange coil 21, but since the water in the conduit 11 never exceeds 150° F., unlike a steam or radiant heat system, the room temperature is not affected when the fans are stopped due to the relatively low temperature differential from the coil to the room and the insulation therebetween whereby heat transfer is minimal. This is also true during the summer months when room heating might not be desirable.

From the above description, it is readily apparent that this system is simple in operation and construction, thereby reducing both the installation and operation costs of the device. Costs are further reduced because certain permits required for most heating systems are unnecessary.

Because the system operates at a relatively low temperature, between 140° F. and 150° F., the dust in the air is not charred as it is in some systems, making this system a substantially clean system.

Not only does this system eliminate the expensive valves normally required in a fluid flow heating system, it eliminates ducts such as those used in a forced air heating system. Since there are no ducts, the "air rush" noise of a forced air heating system is virtually nonexistent.

Having fully described my invention, it is to be understood that I do not wish to be limited to the details herein set forth, but my invention is of the full scope of the appended claims.

I claim:

1. A building temperature control and potable water system comprising a single continuous closed loop conduit means for water, continuously operating pump means connected in said conduit means for circulating the water continuously around said closed loop conduit means, means connected in said conduit means for maintaining the water at a predetermined temperature, at least one branch conduit from said looped conduit means for selective extraction of potable water from the system, a water supply conduit for replacing extracted water connected to said looped conduit means, a plurality of heat exchange coils all connected in series in said looped conduit means, each said heat exchange coil positioned adjacent to but separated from an area in the building requiring air temperature control, and air circulating means associated with each said heat exchange coil and being selectively operable as air temperature control is required in such area for passing air over said coil into the area.

2. The combination set forth in claim 1 in which said means for maintaining the water at a predetermined temperature is a conventional thermostatically controlled hot water heater normally found in potable hot water systems.

3. The combination set forth in claim 1 in which said air circulating means is an electric fan operated by a thermostat control responsive to the air temperature in the area in which the temperature is to be controlled.

4. A building area heating and potable hot water system comprising a single continuous closed loop conduit means for water, a pump connected in said conduit means for continually circulating the water through and around said closed loop conduit means, a heating means connected in said conduit means for maintaining the water at a predetermined temperature, at least one branch conduit from said looped conduit means for selective extraction of potable hot water from the system, a water supply conduit connected to said looped conduit means at a point upstream of the heating means for replacing extracted water, a plurality of heat exchange coils connected in series in said looped conduit means, a selectively operable air circulating means associated with each said heat exchange coil for only passing air over said coil into the area to be heated when heating is required, and means separating each said heat exchange coil from such area for preventing any significant heat transfer to the area when said air circulating means is not operated.

5. The combination set forth in claim 4 in which said means for maintaining the water at a predetermined temperature is a conventional thermostatically controlled hot water heater normally found in potable water systems, said heater maintaining the water at about 150°.

6. The combination set forth in claim 4 in which said air circulating means is an electric fan operated by a thermostat control responsive to the air temperature in the area in which the temperature is to be controlled.

7. A building temperature control system for a building having pairs of conventional structural members positioned in spaced and parallel relation, such as joists or studs, and necessary for the construction of the building comprising: a single continuous closed loop fluid circulating means, a plurality of separate heat exchanger apparatus all connected in series with said fluid circulating means, each said heat exchanger apparatus having a heat exchange coil and an air circulating means, said coil having an inlet and outlet for circulating fluid through said coil, enclosing means on both sides of said spaced structural members with at least one of said enclosing means comprising a conventional portion of the building, said enclosing means and said structural members alone forming a plenum without any encircling air conducting means positioned therein, said coil and said air circulating means mounted directly in and on said plenum in series air flow relationship for said air circulating means to pass air over said heat exchange coil, and means to communicate air into said plenum from the building for passing through said heat exchanger apparatus and then back into the building.

8. The combination set forth in claim 7 in which said means to communicate air from the building through said heat exchanger apparatus back into the building comprises a pair of air flow registers located in said enclosing means, said registers being spaced a substantial distance apart and located at substantially the same level to inhibit thermosiphonic air circulation.

9. A building temperature control system for use in a building having pairs of conventional structural members positioned in spaced and parallel relation, such as joists or studs, and necessary for the construction of the building, the improvement comprising, in combination: a single continuous closed loop conduit means for fluid; means for continuously circulating the fluid in said conduit means, means connected in said conduit means for maintaining the fluid at a predetermined temperature, at least one branch conduit from said looped conduit means for selective extraction of fluid from the system, a fluid supply conduit for replacing extracted fluid connected to said looped conduit means at a point upstream of the said means for maintaining the fluid at a predetermined temperature, a plurality of heat exchanger apparatus each having a heat exchange coil and an air circulating means, said coil having an inlet and outlet for circulating fluid through said coil and being connected in series flow relationship in said closed loop conduit means, enclosing means on both sides of said spaced structural members with at least one of said enclosing means comprising a conventional portion of the building, said enclosing means and said structural members alone forming a plenum, said coil and said air circulating means mounted directly within said plenum and in series air flow relationship in said plenum for said air circulating means to pass air over said heat exchange coil, and means to communicate air from the building through the plenum and said heat exchanger apparatus back into the building.

10. The system of claim 1 wherein a plenum is located adjacent each said area requiring air temperature control and each said heat exchange coil is mounted in said plenum, means insulating said heat exchange coil from said area and means inhibiting air circulation through said plenum when said air circulating means is not operating, both said last-mentioned means serving to minimize undesired and uncontrolled heat transfer between said area and said coil.

11. The system of claim 4 wherein the said means separating each coil from the area comprises a plenum in which said coil is mounted and means inhibiting air circulation through said plenum when said air circulating means is not operating.

12. The system of claim 4 wherein the said means separating each coil from the area comprises a plenum in which said coil is mounted, said plenum extending horizontally and having inlet and outlet registers at substantially the same elevation for inhibiting gravity-caused convection air circulation through the plenum which would otherwise introduce undesired warm air into the area.

References Cited

UNITED STATES PATENTS

| | | | |
|---|---|---|---|
| 2,240,731 | 5/1941 | Van Vulpen | 237—5 |
| 2,745,941 | 5/1956 | McElhaney. | |
| 709,518 | 11/1893 | Smith | 237—49 |
| 1,715,040 | 5/1929 | Mauck | 237—8 |
| 2,021,583 | 11/1935 | Whiteley | 165—48 |
| 2,149,545 | 3/1939 | Price. | |
| 2,277,247 | 3/1942 | Morse | 237—49 |
| 2,348,610 | 5/1944 | Colby | 237—19 |
| 2,519,266 | 7/1950 | Main | 237—8 |
| 3,144,991 | 8/1964 | Marchant | 237—8 |

EDWARD J. MICHAEL, Primary Examiner

U.S. Cl. X.R.

237—19, 49